UNITED STATES PATENT OFFICE 2,677,686

PYRAZINE DERIVATIVES AND METHOD OF PREPARING THE SAME

Victor K. Smith, Jr., Pearl River, and Samuel Kushner, Nanuet, N. Y., assignors to American Cyanamid Company, New York, N. Y., a corporation of Maine No Drawing. Application July 22, 1952, Serial No. 300,336

8 Claims. (Cl. 260—250)

This invention relates to mono-substituted pyrazine. More particularly, it relates to substituted-2-carbonyl pyrazine.

The role of vitamins in nutrition is well known and assumes greater importance as new information is made available concerning the particular function of each. Recently it has been found that folic acid was effective in curing macrocytic anemias and other blood conditions. Also, compounds which are folic acid antagonists, such as aminopterin, have been found useful in treating abnormal blood conditions such as leukemia. It is well established that nicotinamide is an important vitamin of the B complex group and its deficiency is the specific cause of pellagra.

We have now found that certain substituted pyrazines hereinafter defined have the property of inhibiting the nicotinamide response of L. arabinosus and exhibit an antagonistic effect on nicotinamide growth response in chicks. The compounds therefore assume importance in experimental medicine and nutrition since vitamin deficiency symptoms may result from the presence of antagonists as well as from the absence of the vitamin.

The compounds of the present invention may be illustrated by the following general formula:

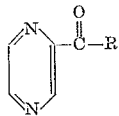

in which R is an alkyl or aryl radical.

These compounds are crystalline solids or relatively high boiling liquids. They are soluble in ether, chloroform, carbon tetrachloride, etc. and somewhat soluble in water.

The compounds of the present invention are prepared by reacting cyanopyrazine with an alkyl or aryl magnesium iodide or bromide in the presence of an anhydrous solvent.

The intermediates used in the process of the present invention may be, for example, methyl iodide, ethyl iodide, propyl iodide, butyl iodide, methyl bromide, ethyl bromide, propyl bromide, butyl bromide, bromobenzene, iodobenzene, bromonaphthalene, iodonaphthalene, and the like.

In carrying out the process of the present invention the cyanopyrazine is mixed with the desired intermediate under anhydrous conditions in an anhydrous solvent at a temperature below 5° C. The product separates as a solid complex which is decomposed by water or ice. Following solution of the product in the reaction mixture, the two layers are separated and the aqueous layer is extracted with a solvent, such as diethyl ether. The ether can be concentrated and the desired compound crystallized out or the ether can be removed and the product distilled.

The reaction of the present invention may be carried out at a temperature of —10° to 15° C. The reaction is complete in from about a few minutes up to about two hours.

The process of the present invention is described in greater particularity by the following specific examples which are given by way of illustration and not limitation.

Example 1

Exactly 5.5 gms. (2 moles) of magnesium turnings is placed in a dry, three-necked, round-bottomed flask fitted with a mercury-sealed stirrer, a reflux condenser and drying tube, a dropping funnel, and a removable ice bath. Then 33 gms. (2 moles) of methyl iodide is dissolved in 50 ml. of anhydrous ether in a dry Erlenmeyer flask. A small portion of this latter solution is introduced into the round-bottomed flask along with a minute iodine crystal. As soon as the reaction commences, 200 ml. of anhydrous ether is added. With slow stirring, the remainder of the methyl iodide solution is now added dropwise just rapidly enough to maintain vigorous refluxing. After complete formation of the Grignard reagent, the mixture is cooled by means of the ice bath and then 12 gms. (1 mole) of cyanopyrazine dissolved in 50 ml. of anhydrous ether is added dropwise. During this addition the temperature of the mixture is kept at 0°–5° C. by use of the ice bath and vigorous stirring is maintained. A solid precipitates from solution during this addition. Cold water is then added slowly with vigorous stirring until the precipitate has dissolved. The ice bath is used to keep the mixture cool. The entire liquid mixture is then transferred to a separatory funnel and the two liquid layers are separated. The aqueous residue, after saturation with potassium chloride, is washed twice with ether and the ether washes are added to the original ethereal extract. The combined ether solutions are dried with anhydrous magnesium sulfate and filtered. The filtrate is concentrated to small volume and cooled, thereby causing the 2-acetylpyrazine to crystallize from solution.

Example 2

To 20 g. of bromobenzene in 50 cc. of diethyl ether was added 2.5 g. of magnesium turnings. The phenylmagnesium bromide obtained is reacted with 10.5 g. of cyanopyrazine. After adding ice, the complex was decomposed with ammonium chloride and the product was extracted with ether. The ether was distilled off and the benzoylpyrazine was distilled from the residue and had a boiling range of 190°–200° C./20 mm. The product was further characterized by the preparation of the 2,4-dinitrophenylhydrazine of the benzoylpyrazine.

We claim:

1. Compounds having the general formula:

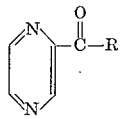

in which R is a member of the group consisting of alkyl, naphthyl and phenyl radicals.

2. A lower alkyl carbonyl pyrazine.
3. Acetylpyrazine.
4. Benzoylpyrazine.
5. A method of preparing compounds having the formula:

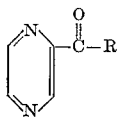

in which R is a member of the group consisting of alkyl, naphthyl and phenyl radicals which comprises reacting a member of the group consisting of an alkyl magnesium halide, naphthyl magnesium halide and phenyl magnesium halide with cyanopyrazine and recovering said compound therefrom.

6. A method of preparing a lower alkyl carbonyl pyrazine which comprises reacting a lower alkyl magnesium bromide with cyanopyrazine and recovering said compound therefrom.

7. A method of preparing acetylpyrazine which comprises reacting methyl magnesium bromide with cyanopyrazine and recovering said compound therefrom.

8. A method of preparing benzoylpyrazine which comprises reacting phenyl magnesium bromide with cyanopyrazine and recovering said compound therefrom.

No references cited.